United States Patent
Chaudhry et al.

(10) Patent No.: US 9,185,443 B1
(45) Date of Patent: Nov. 10, 2015

(54) METHOD AND SYSTEM FOR DETERMINING A CHANNEL SERVICE

(75) Inventors: Kapil Chaudhry, Cerritos, CA (US); Jin H. Chung, Fullerton, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1686 days.

(21) Appl. No.: 12/419,216

(22) Filed: Apr. 6, 2009

(51) Int. Cl.
   *H04N 7/173* (2011.01)
   *H04N 7/16* (2011.01)
   *H04N 21/254* (2011.01)

(52) U.S. Cl.
   CPC ................. *H04N 21/2541* (2013.01)

(58) Field of Classification Search
   CPC .. H04N 21/254; H04N 21/2541; H04N 21/25
   USPC ............................................. 725/63, 25, 107
   See application file for complete search history.

(56) References Cited

U.S. PATENT DOCUMENTS

| | | | |
|---|---|---|---|
| 5,592,470 A * | 1/1997 | Rudrapatna et al. | 370/320 |
| 7,257,514 B2 * | 8/2007 | Faihe | 702/183 |
| 7,789,302 B2 * | 9/2010 | Tame | 235/382 |
| 7,830,816 B1 * | 11/2010 | Gonzalez et al. | 370/252 |
| 7,930,736 B2 * | 4/2011 | Crespo et al. | 726/8 |
| 7,953,976 B2 * | 5/2011 | Giles et al. | 713/168 |
| 2002/0099800 A1 * | 7/2002 | Brainard et al. | 709/219 |
| 2002/0170053 A1 * | 11/2002 | Peterka et al. | 725/31 |
| 2004/0181801 A1 * | 9/2004 | Hagen et al. | 725/32 |
| 2006/0251053 A1 * | 11/2006 | Croak et al. | 370/352 |
| 2007/0124771 A1 * | 5/2007 | Shvadron | 725/61 |
| 2007/0266026 A1 * | 11/2007 | Aravamudan et al. | 707/7 |
| 2008/0065652 A1 * | 3/2008 | McCann et al. | 707/100 |
| 2008/0101401 A1 * | 5/2008 | Storry et al. | 370/463 |
| 2010/0054136 A1 * | 3/2010 | Mehta et al. | 370/245 |
| 2010/0146529 A1 * | 6/2010 | Heath et al. | 725/14 |

* cited by examiner

*Primary Examiner* — James R Sheleheda

(57) ABSTRACT

A method and system for identifying a service includes a service locator module and a customer service device communicating a channel signal to a service locator module from a customer service module. The service locator module generates a service signal associated with the channel signal and communicates the service signal to the customer service device.

27 Claims, 2 Drawing Sheets

METHOD AND SYSTEM FOR DETERMINING A CHANNEL SERVICE

TECHNICAL FIELD

The present disclosure relates generally to communication systems, and more particularly, to a method and system for determining a service from a channel.

BACKGROUND

The statements in this section merely provide background information related to the present disclosure and may not constitute prior art.

Communication systems such as pay or subscription communication systems include a primary service provider and a user receiver device such as a set top box or integrated receiver decoder. The user device is typically provided with authorization to communicate with the primary service provider and receive services therefrom. One example of such a system is a satellite television system such as DIRECTV®. Broadcast television channels and other internal programs are provided by the primary service provider.

Sometimes customers experience problems receiving a channel. This typically results in the customer calling customer service to report that what was previously received is no longer being received. Diagnosing specific problems with channels over the telephone is difficult. The customer service agent must determine the package the customer has at the time of the call and compare the packages for the channel. To determine a package on a given channel, the schedule for the program must also be determined. This is time-consuming and, therefore, increases the cost of the system.

SUMMARY

The present disclosure provides a system and method for providing services at the schedule level. The packages assigned to the services may be provided so that the customer service agent may correctly respond to customer calls.

In one aspect of the disclosure, a method includes communicating a channel signal to a service locator module from a customer service module, generating a service signal associated with the channel signal and communicating the service signal to the customer service device.

In another aspect of the disclosure, a system for identifying a service includes a service locator module and a customer service device communicating a channel signal to a service locator module from a customer service module. The service locator module determines a service associated with the channel signal and communicates the service signal to the customer service device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
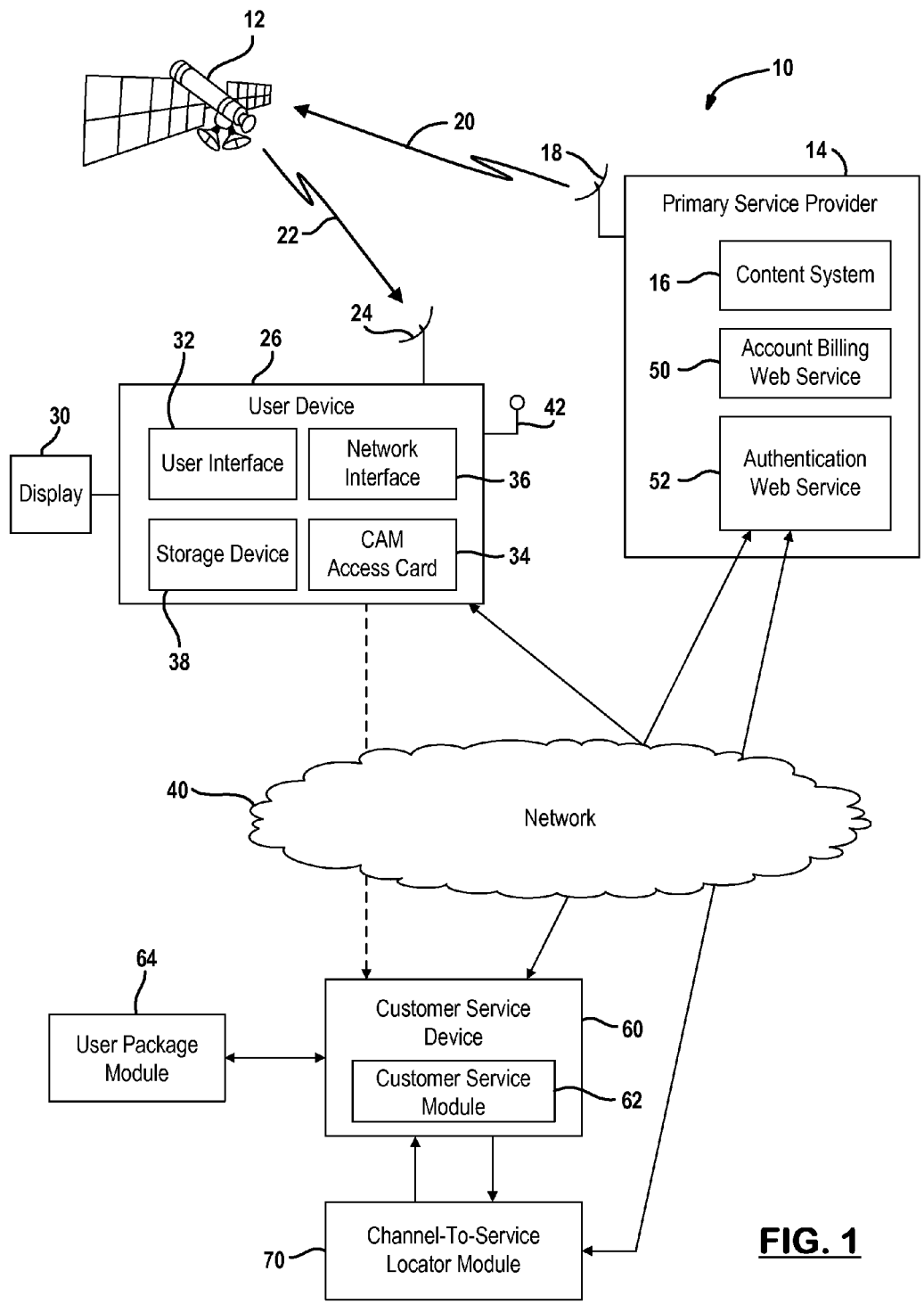
FIG. 1 is a block diagrammatic view of a satellite communication system according to the present disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Further, while the following disclosure is made with respect to the delivery of content (e.g., television (TV), movies, games, music videos, etc.), it should be understood that the systems and methods disclosed herein could also be used for delivery of any media content type, for example, audio, music, data files, web pages, games, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title or program will be used to refer to, for example, a media content type such as a movie itself and not the name of the movie.

Referring now to FIG. 1, a satellite television broadcast system 10 is illustrated. The satellite television broadcast system 10 is illustrated by way of example. However, the present disclosure is not so limited as mentioned above. The television broadcast system 10 includes a satellite 12 that receives content or programming from a primary service provider 14. More specifically, the primary service provider 14 includes a content system 16 that generates uplink signals 20 corresponding to the content through an uplink antenna 18. As mentioned above the content may be various types of content including but not limited to live content, recorded content, pay-per-view content and on-demand content. The uplink signals 20 may be television signals and more specifically digital television signals associated with various channels. The uplink signals 20 may also be data including but not limited to interactive television data and program guide data.

The uplink antenna 18 communicates the uplink signals 20 to the satellite 12 which in turn generates downlink signals 22. The downlink signals 22 are communicated to a receiving antenna 24 on a user device 26. Although only one user device 26 is illustrated, several user devices may be provided in the system 10. The uplink signals 20 and downlink signals 22 may be referred to as communication signals. Communication signals are wireless communication signals and may include various types of entertainment content, data, traffic, weather, hazardous material warnings, advertising material, guide data and the like. As mentioned above, this system may be suitable for wired systems such as cable televisions and terrestrial wireless systems.

The user device 26 may include a satellite television receiver, set top box or a digital video recorder. The satellite television receiver may also be referred to as an integrated receiver decoder. Of course, other types of user devices may be used such as a cable television set top box. Other types of user devices may also include a mobile device such as a laptop computer, cellular phone, personal digital assistant, a portable media player or an automotive-based television receiving device. Thus, the user device 26 may be a fixed user device in the case of a satellite television set top box or a mobile user device. Both fixed and mobile devices may be used in a system.

The user device 26 may be associated with a display 30 for displaying content and programming, as well as displaying various types of user commands, or the like. The display 30 may be a television or display integrated into the device. The display 30 may include speakers for an audio display. The display 30 may be used for displaying primary content from a primary service provider and secondary content from a secondary service provider.

The user device 26 may include a user interface 32, such as a keyboard, remote control, or the like, for selecting and entering various types of information by the user. The user device 26 may also include a conditional access module 34 that allows the user to access the programming provided from the content system 16. The conditional access module 34 may be referred to as an access card. The conditional access module 34 may include various activation codes without which the user device 26 is not activated. The conditional access module 34 may include a conditional access module identifier such as a number or a code.

The user device 26 may also include a network interface 36 for interfacing with a network 40. For example, the network interface 36 may communicate wirelessly through the antenna 42 or through a direct connection such as an Ethernet connection. The network interface 36 may be but is not limited to a wireless broadband interface, a broadband interface, a modem-type interface or a public-switched telephone network interface.

The user device 26 may also include a storage device 38. The storage device 38 may store various content received from the primary service provider therein. The content may be received through the satellite 12 or through the network 40 through the network interface 36. The storage device 38 may be a hard disk drive or memory chip-based device. The storage device 38 may be referred to as a digital video recorder.

The user device 26 may be in communication with the primary service provider 14 through a network 40. The network 40 may be a secured network or use a secure protocol. The network 40 may include a broadband network through which the user device 26 communicates with the primary service provider 14. The network 40 may be a wired network such as a public-switched telephone network (PSTN) or a broadband Internet network. The network may be wireless such as a cellular or wireless Internet system. The broadband network may communicate wired, wirelessly or a combination of both. The network 40 may also be an intranet. The components of both the primary and partner service provider may be located separately or in the same building.

The primary service provider may include an account billing web service 50 and an authentication web service 52. The account billing web service 50 provides an association of the accounts of each of the users as well as a listing of the packages subscribed thereto. The authentication web service 52 may be used to generate eTokens for secure communications through the network 40.

The user device 26 may be in communication with a customer service device 60. The customer service device 60 may be in communication with the user device 26 through the network 40. In addition, the user device 26 may be in communication with the customer service device 60 through a telephone network or the like. A user associated with the user device 26 may communicate verbal commands or questions to the customer service device 60. The customer service device 60 may include a customer service module 62 for diagnosing problems with a service. The customer service device 60 may also be in communication with a user package module 64. The user package module may provide a correlation of the user to packages subscribed thereto. It should be noted that the customer service device 60 may be a separate device or associated with a separate service provider than the primary service provider 14. For example, a web service or a telephone or internet service provider may provide service including bundling the services of the primary service provider to various customers. Therefore, customer support may be provided at a separate customer service device. The customer service device 60 may receive a user identifier.

The customer service device 60 may also be in communication with a channel-to-service locator module 70. The channel-to-service locator module 70 may generate a service corresponding to a channel request back to the customer service device. That is, the customer service device may communicate a channel signal to the channel-to-service locator module 70 and a service associated with the channel may be provided to the customer service device. The customer service device may also provide a user zip code, a specific time period of interest, or both. By providing a time period, the customer service agent may look back at a previous time of interest to determine the services. The customer service device 60 may also provide a site identifier and a site user identifier to the channel-to-service locator module. The site user identifier and the site user identifier may be used in the authentication process. The customer service device 60 may also provide an eToken obtained from the authentication web service 52 of the primary service provider. The eToken may be communicated to the channel-to-service locator module 70 so that secure communications take place. As will be described below, the channel-to-service locator module may also communicate a second eToken to the customer service device when a successful channel signal is received from the customer service device. Further communications between the customer service device 60 and the channel-to-service locator module 70 may use the updated or second eToken. Additional eTokens may be generated after each successful communication between the customer service device 60 and the channel-to-service locator module 70.

The channel-to-service locator module 70 may also communicate with the authentication web service 52 to verify the eToken provided from the customer service device 60.

The customer service device 60 and the channel-to-service locator module 70 may communicate through the network 40.

Communications may take place using a simple object access protocol (SOAP). Hypertext transfer protocol may also be used.

Further, various types of compressions such as gzip may also be applied at an HTTP layer to significantly reduce the normal size of the SOAP messages. This will increase the speed of the communication between the various devices and modules.

Figure 2:
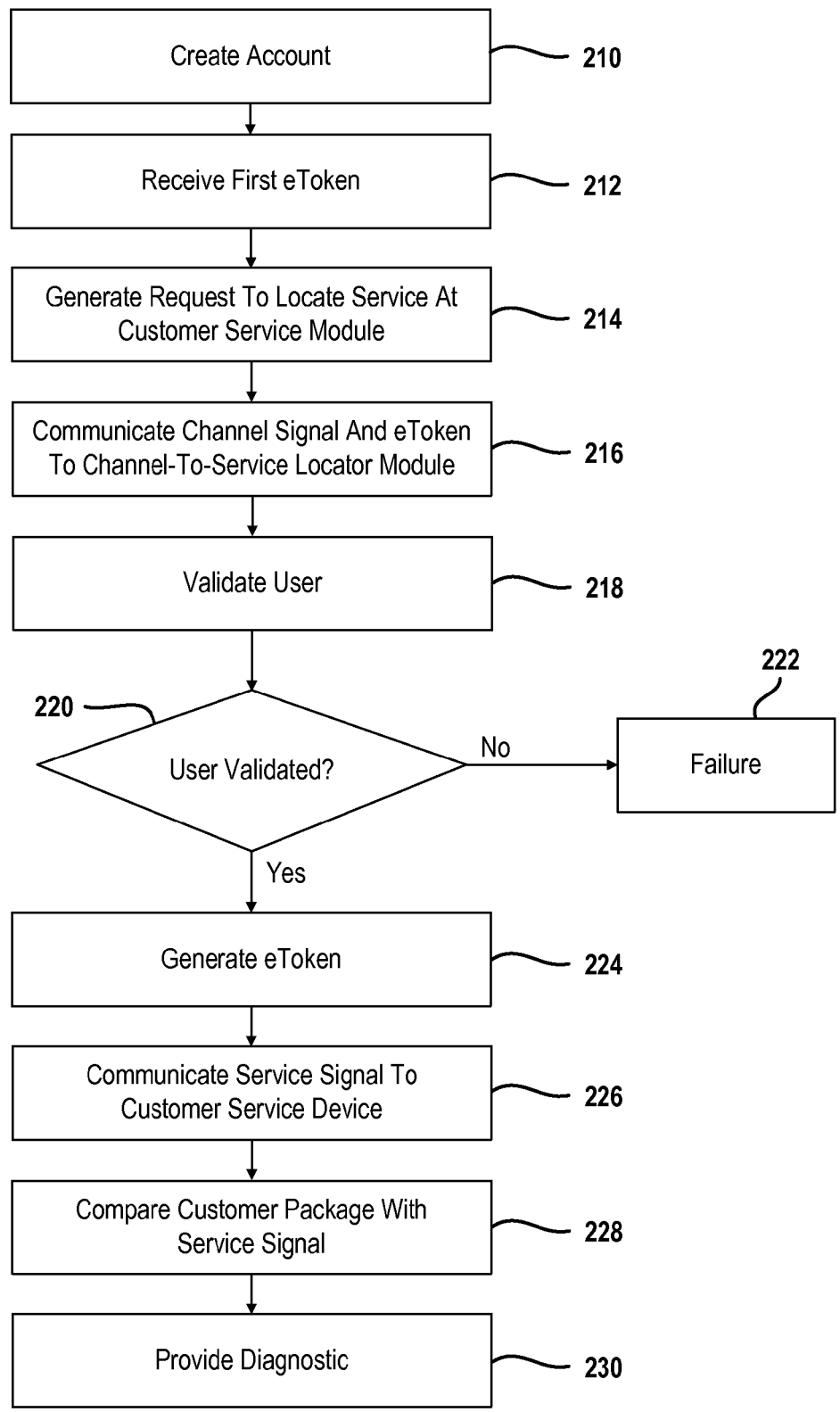
FIG. 2 is a flowchart of a method of identifying a service for a user system.

Referring now to FIG. 2, a method for operating the system is set forth. In step 210, an account is created for the customer service device 60. The account setup may also include associating a site identifier for the customer service device and a site user identifier with the customer service device. The account is setup using the authentication web service of the primary service provider. The account may also be setup to be generic or account-specific.

A first eToken may be issued by the authentication web service 52 when an account is created in step 212. In step 212, the first eToken is received by the customer service device from the authentication web service of the primary service provider.

In step 214, a request is generated to locate the services associated with the channel at the customer service module. The request signal may include the eToken, the site identifier and the site user identifier as well as a channel identifier or channel number. The request signal is communicated along with the eToken to the channel-to-service locator module in step 216.

In step 218, the customer service device and the user associated therewith is validated. Validation may take place using the eToken, site identifier and site user identifier. Validation may take place directly at the channel-to-service locator module or within the authentication web service 52 through the network 40. Secure communications may take place using SOAP as mentioned above. In step 220, if the user is not validated a failure of validation signal is provided back to the customer service device. The system may be started again after step 222. This may correct any errors associated with the communication.

After step 220, if the user is validated a new or second eToken may be generated in step 224. Subsequent communications may use the second eToken.

In step 226, a service signal is communicated to the customer service device based upon the channel signal provided through using the request from step 216. The request from step 216 may also include a service time as well as a user device location data such as a zip code or other geographic information. The location data may also include a designated marketing area (DMA). The service signal in step 226 may include a service identifier that may be an integer associated with a various service. A service name that includes a string of characters may also be communicated to the customer service device. The service identifier and the service name may be specific and based upon the service time and the location identifier.

The customer service device may compare the customer package with the service signal in step 228. The service associated with the channel may be compared to the packages subscribed to by the user. Some sporting events may not be associated with a particular package, for example. In step 230, if a problem is found with the reception or other event, a diagnostic may be provided. The diagnostic may perform various types of diagnostics, including communicating a request for diagnostics from the customer service device to the primary service provider. The primary service provider may then provide a conditional access packet to the user device 26 to enable a particular service. The customer service device 60 may also communicate verbally with a user associated with the user device 26 to perform certain actions such as pressing certain buttons on the set top box or making certain selections with the user interface 32 illustrated in FIG. 1. By requesting the user associated with the user device 26 to perform certain actions a remedy may be accomplished.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
receiving a first request from a user device by a customer service device via a network, wherein the user device generates the first request to locate services of a customer package transmitted from a service provider to the user device,
transmitting a channel signal to a service locator module from a customer service module of the customer service device based on the first request;
generating a service signal associated with the channel signal;
communicating the service signal to the customer service device;
comparing the service signal to the customer package of the user device; and
transmitting a diagnostic request from the customer service device to the service provider via the network and based on the comparing of the service signal to the customer package.

2. A method as recited in claim 1 further comprising:
prior to communicating the channel signal, obtaining a first eToken from the service provider; and
prior to generating the service signal, validating the first eToken.

3. A method as recited in claim 1 further comprising:
prior to communicating the channel signal, obtaining a first eToken from the service provider; and
prior to generating the service signal, validating the first eToken via an authentication web service device of the service provider.

4. A method as recited in claim 1 further comprising transmitting a time indicator from the customer service module to the service locator module, and wherein the service signal is generated based on the time indicator.

5. A method as recited in claim 1 further comprising transmitting a location indicator from the customer service module to the service locator module, wherein:
the service signal is generated based on the location indicator; and
the location indicator indicates at least one of a designated marking area and geographical information of the user device.

6. A method as recited in claim 1 further comprising transmitting a location indicator and a time indicator from the customer service module to the service locator module, wherein:
the service signal is generated based on the location indicator and the time indicator; and
the location indicator indicates at least one of a designated marking area and geographical information of the user device.

7. A method as recited in claim 1 further comprising transmitting an eToken from the customer service module to the service locator module, and wherein the service signal is generated based on the eToken.

8. A method as recited in claim 1 further comprising transmitting an eToken and a site identifier from the customer service module to the service locator module, and wherein the service signal is generated based on the eToken and the site identifier.

9. A method as recited in claim 1 further comprising transmitting an eToken, a site identifier and a user identifier from the customer service module to the service locator module, and wherein the service signal is generated based on the eToken, the site identifier and the user identifier.

10. A method as recited in claim 1 further comprising transmitting a channel name from the customer service module to the service locator module, and wherein the service signal is generated based on the channel name.

11. A method as recited in claim 1 further comprising transmitting an eToken from the customer service device to the service locator module, wherein the channel signal is generated based on the eToken.

12. A method as recited in claim 1 further comprising:
receiving a user identifier; and
determining the customer package based on the user identifier.

13. A system comprising:
a service locator module; and
a customer service device configured to receive a first request from a user device via a network, wherein the user device generates the first request to locate services of a customer package transmitted from a service provider to the user device, and wherein the customer service device is configured to transmit a channel signal to the service locator module from a customer service module based on the first request,
wherein said service locator module is configured to generate a service signal associated with the channel signal and communicating the service signal to the customer service device, and
wherein the customer service device is configured to compare the service signal to the customer package of the user device and transmit a diagnostic request to the service provider via the network and based on the comparison of the service signal to the customer package.

14. A system as recited in claim 13 further comprising the service provider communicating an eToken to the customer service device,
wherein the service locator module is configured to validate the eToken, determines the customer package, and then compares the channel signal to the customer package.

15. A system as recited in claim 14 wherein the service locator module validates the eToken prior to generating the service signal by communicating with an authentication web service device at the service provider.

16. A system as recited in claim 13 wherein:
the customer service device is configured to transmit a user location signal to the service locator module; and
the service locator module is configured to generate the service signal based on the user location signal.

17. A system as recited in claim 13 wherein:
the customer service device is configured to transmit a time signal to the service location module; and
the service locator module is configured to generate the service signal based on the channel signal and the time signal.

18. A system as recited in claim 17 wherein the time signal comprises a present time.

19. A system as recited in claim 17 wherein the time signal comprises a past time.

20. A system as recited in claim 13 wherein:
the channel signal comprises a channel identifier;
the customer service device communicates the channel identifier, an eToken and a site identifier to the service locator module; and
the customer service device is configured to generate the service signal based on the channel identifier, the eToken and the site identifier.

21. A system as recited in claim 13 wherein:
the channel signal comprises a channel identifier;
the customer service device communicates the channel identifier, an eToken, a site identifier and a user identifier to the service locator module; and
the customer service device is configured to generate the service signal based on the channel identifier, the eToken, the site identifier and the user identifier.

22. A system as recited in claim 13 wherein the service signal comprises a service identifier and a channel name.

23. The system of claim 13 wherein the customer service device transmits the diagnostic request to the service provider to cause the service provider to transmit a conditional access packet to the user device.

24. The system of claim 23 further comprising the service provider configured to receive the diagnostic request via the network and transmit the conditional access packet to the user device, wherein the conditional access packet comprises actions to be performed by the user device to correct a problem receiving the customer package by the user device.

25. The system of claim 13 wherein the network is between:
the user device and the service provider;
the user device and the customer service device; and
the customer service device and the service provider.

26. The system of claim 13 wherein the customer package includes television programs.

27. A satellite communication system comprising:
the system of claim 13;
a satellite; and
the service provider communicating an eToken to the customer service device and communicating content to the user device through the satellite.

* * * * *